Patented Jan. 25, 1949

2,460,038

UNITED STATES PATENT OFFICE 2,460,038

EMULSION POLYMERIZATION PROCESS

George E. Serniuk, Roselle, N. J., assignor to Standard Oil Development Company, a corporation of Delaware No Drawing. Application July 17, 1943, Serial No. 495,213

8 Claims. (Cl. 260—23.7)

This invention pertains to the production of polymers and particularly synthetic rubber-like materials by the emulsion technique.

It has been known for some time that synthetic rubber-like materials may be obtained by polymerizing diolefins such as butadiene and isoprene alone or in admixture with copolymerizable materials such as styrene, substituted styrenes, acrylic acid nitrile, methacrylic acid nitrile, acrylic and methacrylic acid esters, fumaric acid esters, unsaturated ketones such as methyl vinyl ketone and the like in aqueous emulsion using a polymerization catalyst such as hydrogen peroxide, benzoyl peroxide, or alkali or ammonium persulfates or perborates. Many of these synthetic rubber-like materials have been widely adopted as substitutes for natural rubber and in some cases have displaced natural rubber for certain specialty uses because of their superior solvent resistance properties. A serious drawback to these synthetic rubber-like materials, prepared in a soap type emulsion, has been the fact that the polymers as ordinarily produced are extremely difficult to process since they can not be handled easily on ordinary rubber milling or working equipment, have high banding time, have poor plasticity (high Williams plasticity-recovery values) and are very difficult to work up with ordinary compounding ingredients into homogeneous compounds suitable for molding and vulcanization into the desired articles.

Numerous expedients have been adopted by the art in an effort to overcome the above-mentioned difficulties. Such expedients have included, stopping the polymerization at relatively low conversion levels, conducting the polymerization in the presence of polymerization modifiers such as aliphatic mercaptans and the like, and by subjecting the polymer products to a plasticizing process by treating them in the presence of antioxidants with oxygen or agents yielding oxygen at elevated temperatures. While these expedients have been helpful, none seems to have provided an entirely satisfactory solution to this problem.

It is the object of the present invention to provide the art with a method of preparing emulsion polymers of superior processing qualities.

It is also an object of the present invention to provide the art with a method whereby there may be produced emulsion polymers such as butadiene-styrene and butadiene-acrylonitrile copolymers which may be easily handled on a mill and which have a low banding time, a high maximum banding temperature, good plasticity and ease of incorporating compounding ingredients, etc.

It is a further object of this invention to provide the art with a method of preparing emulsion polymers having a considerable amount of tackiness which renders the polymers particularly useful in the manufacture of laminated articles such as motor fuel hose and the like.

These and other objects will appear more clearly from the detailed description and claims which follow.

It has now been found that emulsion polymerizates of the buna type and particularly diolefin-vinyl nitrile copolymers and diolefin-styrene copolymers of high tensile strength and good elongation and plasticity and possessing extremely good processability can be prepared by the emulsion technique wherein sodium oleate, sodium salt of tallow acids, sodium stearate, sodium palmitate, etc. or other alkali metal salts thereof, is used as the emulsifier, and in the presence of a higher fatty acid, preferably an unsaturated acid of high molecular weight such as soybean acids, conjugated soybean acids, linseed acids, conjugated linseed acids, oleic acid or acids derived from castor, corn or cottonseed, olive, peanut, rapeseed, sesame, sunflower, teaseed, oiticica oils, etc., in the free state and concentrations of about 0.7% to about 5% based on the water phase. The free higher fatty acids are used in conjunction with various amounts of a modifier such as a primary, secondary or tertiary mercaptan of $C_8$ to $C_{18}$ carbon atoms or xanthogen disulfides, etc., and in the presence of varying amounts of a polymerization initiator, such as potassium persulfate in the aqueous phase, and a hydrocarbon soluble catalyst, such as benzoyl peroxide, oleyl peroxide or stearyl peroxide, etc. Since the more unsaturated or polyolefinic acids exert an inhibiting action on the polymerization, it is, as a general rule, advisable to use these acids in amounts near the lower parts of the above-mentioned range in order to avoid a too drastic effect upon the polymer formed. When a saturated fatty acid is added to a soap emulsifier in conjunction with a hydrocarbon soluble peroxide as above, the products obtained possess improved plasticity values, but do not exhibit high temperature milling characteristics comparable to those prepared in the presence of unsaturated free acids.

While products of comparable processability may be obtained in the absence of free fatty acid by increasing the concentration of mercaptan modifier used the resultant products become too plastic and suffer a marked reduction in tensile strength. By adding free fatty acid to the reaction mixture in accordance with the present invention, however, the product progressively improves in plasticity, banding time and maximum banding temperature without any marked change in the tensile strength and per cent elongation. It has also been found that a hydrocarbon soluble peroxide, such as benzoyl peroxide, when added to the olefinic reactants in concentrations ranging from 0.001 to 1.0% based on the reactants, aids in the production of an easily processable, essentially gel-free product when used in the presence of soap type emulsions containing free fatty acid of unsaturated type, mercaptan modifiers and persulfate catalysts as described above. The use of free fatty acid in accordance with the present invention also makes it possible to operate at a pH range of 8.5 to 7.0 without suffering any reduction in the initial soap concentration or coagulation of the latex formed.

The present invention is applicable to the production of emulsion polymerizates of dienes or mixtures of two or more dienes or mixtures of dienes with various copolymerizable compounds.

The dienes that may be used in accordance with the present invention include butadiene-1,3, isoprene, dimethyl butadiene, chloroprene, phenyl butadiene, phenyl-1-methyl-3-butadiene-1,3, piperylene, etc.

The copolymerizable compounds which may be used include acrylic and methacrylic acid nitriles, acrylic and methacrylic acid esters, fumaric acid esters, unsaturated vinyl ketones, styrene, substituted styrenes such as α-alkyl styrene, α-alkyl-p-alkyl styrenes and substituted styrenes, vinyl naphthalene, vinyl carbazole, vinyl pyridine, etc.

The number, type and ratio in which the reactants are used is variable depending upon the properties desired in the final products. As, for example, a diolefin can be copolymerized with a combination of copolymerizable compounds as butadiene with styrene and acrylonitrile, isoprene with styrene and acrylonitrile, isoprene and butadiene with acrylonitrile or with styrene, etc. The diolefinic constituent or constituents usually predominate, the preferred ratios in the case of preparing copolymers with the copolymerizable compounds listed above are about 2 to 4 parts of diolefin per part of copolymerizable compound.

The emulsifier is preferably prepared from equivalent amounts of an alkali metal and a high molecular weight fatty acid of a saturated type, however, a U. S. P. oleic acid, which consists of stearic, palmitic, oleic, linoleic and linolenic acids, can be used. The free fatty acids suitable in this case are as given above. The modifiers which can be used are primary mercaptans such as octyl, lauryl, Lorol, myristyl, cetyl and octadecyl mercaptan, secondary and tertiary mercaptans and xanthogen disulfides. The polymerization modifiers are generally used in amounts of between 0.1 and about 1% based upon the monomers but greater amounts, even up to 10% may be used if an extremely tacky product is desired. Suitable catalysts are hydrogen peroxide, persulfates, perborates, hydrogen peroxide-salt addition compounds, benzoyl peroxide and derivatives thereof, oleyl and stearyl peroxides, tertiary butyl hydroperoxides, etc. These catalysts can be used singularly or in conjunction with another peroxide as, for example, potassium persulfate can be used as the water soluble catalyst and benzoyl peroxide as the hydrocarbon soluble catalyst. The polymerization catalysts are generally used in amounts of between about 0.05 and about 0.50% based on the water phase.

A typical reaction charge as used in performing an emulsion polymerization in accordance with this invention is given below the parts being by weight. However, it is not intended to be limited thereto.

| | Parts |
|---|---|
| Water—2/1 ratio of H$_2$O/monomers | 400 |
| Sodium salt of tallow acid 2½% on H$_2$O | 10 |
| Conjugated soybean acids—2% on H$_2$O | 8 |
| Acrylonitrile—26% of monomers | 52 |
| Benzoyl peroxide, 0.025% on monomers | 0.05 |
| Lorol mercaptan, 0.5% on monomers | 1.0 |
| Potassium persulfate, 0.15% on H$_2$O | 0.60 |
| Diolefin, 74% of monomers | 148 | pH of initial reaction charge=Ca 8.5— final latex Ca 7.1

Reaction time is variable but generally 20 hours

Reaction temperature is variable but generally at 30° C. to 35° C.

The procedure for charging the reactor is as follows: the water and soap are thoroughly mixed and then the free fatty acid is added to the soap solution. The resultant mixture takes on the appearance of a good emulsion. To this is then added a solution of benzoyl peroxide in acrylonitrile. The entire mixture is agitated and then Lorol mercaptan is added. The potassium persulfate is then added as a solution. The diolefin is weighed in last, the reactor is then sealed and the contents are well agitated on a rotating wheel fixed in a water bath of controlled temperature. At the completion of a run the unreacted diolefin is flashed off, the latex then stabilized with 2% of phenyl-beta-naphthylamine. To the latex is then added a solution of sodium hydroxide equivalent to the amount of free acid used in order to convert this acid into the soap. The latex is then coagulated by means of brine. The coagulate is then mill washed and dried. The dry product is then evaluated physically and chemically.

The following examples are illustrative of the present invention but it is to be understood that my invention is not limited thereto.

EXAMPLE I

A series of copolymers, including a control, were prepared from acrylonitrile and butadiene in the weight ratio of 26/74 and a 2/1 ratio of water to monomers, employing 2½% of sodium oleate as emulsifier, and from 0.7 to 3.53% of free oleic acid and 0.15% of potassium persulfate catalyst based on the water phase and 0.5% of Lorol mercaptan based on the monomers. The reactions were carried out in bomb type reactors at 30° C. for 20½ hours. The latices, after removal from the reactors, were freed from unreacted materials and stabilized by the addition of 2.0% of phenyl-B-naphthylamine based on the copolymer. To the latices was then added an equivalent amount of NaOH solution to convert the free fatty acid to the corresponding sodium soap. The latices were then coagulated with brine and the coagulated polymer was washed on a mill fitted with a corrugated roll. The products were then dried for 6 hours at 170° F. in an air oven and then evaluated chemically and physically. The results obtained in this series of runs are summarized in the following table:

in the sol/gel ratio of the product. The product obtained in accordance with the present invention is vastly superior to the control product (run No. 1) in that it bands much quicker and has a much higher bagging temperature and is much more plastic as shown by the Williams plasticity-recovery values. In spite of its greater plasticity, however, products produced in accordance with the present invention have tensile strengths about the same as the control and have a substantially greater elongation.

TABLE I

| Run No. | 1 | 2 | 3 | 4 | 5 | 6 |
|---|---|---|---|---|---|---|
| Reaction: | | | | | | |
| Free Oleic Acid in Emulsion, Wt. Per Cent on H₂O | 0 | 0.7 | 1.4 | 2.1 | 2.8 | 3.5 |
| pH of Final Latex | 9.2 | 8.2 | 7.8 | 7.6 | 7.4 | 7.3 |
| Per Cent Conversion | 61 | 85 | 83 | 81 | 76 | 75 |
| Product Analysis: | | | | | | |
| Wt. Per Cent Acrylonitrile | 30 | 27.3 | 27.6 | 27.9 | 28.4 | 28.7 |
| Wt. Per Cent Oleic Acid | 2.1 | 3.9 | 2.1 | 2.4 | 2.4 | 3.3 |
| Sol/Gel Ratio | 30/70 | 100/0 | 100/0 | 100/0 | 100/0 | 100/0 |
| Milling Characteristics: | | | | | | |
| Banding Time, Min | 3 | ¹ 2½ | ¹ Immed. | Immed. | Immed. | Immed. |
| Bagging Temp., °F | 125 | 130 | 135 | >250 | >250 | >250 |
| Physical Evaluations: | | | | | | |
| Tensile, lbs./in.² | 3590 | 3590 | 3780 | 3450 | 3270 | 3470 |
| Elongation, Per Cent | 510 | 680 | 740 | 720 | 820 | 770 |
| Williams Plast.-Rec | 182—29 | 122—12 | 115—12 | 105—5 | 85—0 | 83—2 |
| Freeze Resistance (Shore Hardness) at— | | | | | | |
| +25° C | 70 | 64 | 59 | 60 | 58 | 60 |
| 0° C | 79 | 74 | 70 | 72 | 75 | 76 |
| −10° | 82 | 82 | 81 | 80 | 81 | 84 |
| −20° | 96 | 95 | 93 | 95 | 93 | 93 |
| −30° | 100+ | 100+ | 100+ | 100+ | 100+ | 100+ |

¹ Rebanded at 180° F., no bagging at 250° F.

The following runs were made with amounts of free fatty acids below the ranges of this invention to show the effect of increased mercaptan concentrations upon the physical properties of the products. It will be noted that with increased mercaptan concentrations the products show improvement in banding time, high temperature milling characteristics and good plasticity, however, the products show a reduction in tensile strength.

The following charge was used in all cases following with the exception of mercaptan concentration which ranged from 0.5% to 1.0% based on the hydrocarbon.

H₂O 2/1 ratio to monomers_____parts__ 400
Hydrogenated tallow acids_____do____ 9.3
NaOH, 0.997N_____do____ 27.3
Acrylonitrile, 26% of monomers_____do____ 52.0
Lorol mercaptan, amount_____ variable
Potassium persulfate, 0.15% on
  H₂O _____parts__ 0.60
Diolefin-butadiene, 74% of monomers _____do____ 148
Reaction time _____hours__ 33
Reaction temperature _____C___ 35°

The data are summarized in Table II.

EXAMPLE II

A tacky copolymer was prepared from acrylonitrile and isoprene using the following ratios of reactants:

H₂O _____c. c__ 225
5% sodium oleate_____c. c__ 200
Oleic acid_____c. c__ 10.6
Lorol mercaptan_____gms__ 2.5
Acrylonitrile _____gms__ 108
K₂S₂O₈ _____gm__ 1.0
Isoprene 97% pure_____gms__ 108

The initial reaction temperature was 26° C. and the final reaction temperature was 45° C. The latter temperature was attained exothermally. The total reaction time was 18 hours. The yield was 73% based on total acrylonitrile and isoprene. The polymer, after being washed free of soap and dried, possessed extremely good tack. The product had a slight tendency toward cold flow though not excessive. The product in the gel state had remarkable extensibility and in thin films was transparent.

EXAMPLE III

The product described in Example II was considered to be quite soft. In this experiment the

TABLE II

*Product evaluation*

PRODUCT QUALITY VS. MERCAPTAN CONCENTRATIONS

| Run No. | Mercaptan Conc. Per Cent on Monomers | Conv., Per Cent | Tensile, p. s. i. | Modulus at 300% Elong. p. s. i. | Elongation Per Cent at Break | Band Time Min. at 100° F. | Maximum Band Temp., ° F. | Mooney Vis. at 100° C. |
|---|---|---|---|---|---|---|---|---|
| 218-15-2 | 0.5 | 88.6 | 3,450 | 950 | 600 | >10 | | 86 |
| 218-15-3 | 0.75 | 97.4 | 3,100 | 700 | 625 | 6 | 145 | 55 |
| 218-15-4 | 1.0 | 97.4 | 2,800 | 600 | 650 | 0 | >200 | 36 |

It may be seen therefrom that the use of free oleic acid leads to a very substantial increase in the yield of polymer as well as a radical change in the sol/gel ratio of the product.

amount of free fatty acid was decreased and the mercaptan slightly increased. In this case a 73% yield of a tougher but tacky polymer was obtained which had resistance to cold flow. The reaction conditions for this experiment were the same as in Example II. The proportions of reactants were as follows:

| | | |
|---|---|---|
| H₂O | c. c. | 225 |
| 5% sodium oleate solution | c. c. | 200 |
| Oleic acid | c. c. | 6.0 |
| Lorol mercaptan | gms. | 3.5 |
| Acrylonitrile | gms. | 108 |
| K₂S₂O₈ | gm. | 1.0 |
| Isoprene 97% pure | gms. | 108 |

EXAMPLE IV

An extremely tacky polymer was obtained by reacting equal parts of acrylonitrile and isoprene in emulsion in the presence of 5% of mercaptan prepared from triisobutylene, and in the presence of 3.5% of free oleic acid. The conversion was 85%. At this conversion the product was sufficiently tacky so that it imparted tack to a butadiene-acrylonitrile copolymer of 4000 lbs. tensile when mixed therewith in equal parts.

The proportions of reactants were as follows:

| | | |
|---|---|---|
| H₂O | c. c. | 225 |
| 5% sodium oleate | c. c. | 200 |
| Oleic acid | c. c. | 15 |
| C—12 alkyl mercaptan | gms. | 21.5 |
| Acrylonitrile | gms. | 108 |
| K₂S₂O₈ | gm. | 1.0 |
| Isoprene 97% pure | gms. | 108 |

EXAMPLE V

Several comparative runs were made to illustrate the effect of a free fatty acid of the saturated type and a hydrocarbon soluble peroxide upon the physical properties of a butadiene-acrylonitrile copolymer containing an average of 26% of combined acrylonitrile in the final product. The data from these runs are summarized in Table III set out below. It may be seen therefrom that a saturated acid and a hydrocarbon soluble peroxide give a product of improved plasticity over the control, but give no improvement as regards banding time and high temperature milling characteristics.

|  | Control Run | Free Fatty Acid Run |
|---|---|---|
| Water...parts | 400 | 400 |
| NaOH 1.0176 N...do | 26 | 32.5 |
| Hydrogenated Tallow Acids...do | 9.3 | 9.3 |
| Conjugated Soybean Acid...do | None | 8.0 |
| Acrylonitrile...do | 52 | 52.0 |
| Benzoyl Peroxide...do | None | 0.05 |
| Lorol Mercaptan...do | 1.0 | 1.0 |
| Potassium Persulfate...do | 0.60 | 0.60 |
| Butadiene-1,3...do | 150 | 150 |
| Reaction time...hours | 15 | 20 |
| Reaction temperature...° C. | 35 | 35 |
| Product...grams | 165.8 | 155.5 |
| Conversion...per cent | 82.9 | 77.7 |
| Band Time at 100° F...minutes | >10 | 5 |
| Max. Band Temperature...° F. | | 250 |
| Williams Plast.-Recovery | 128—27 | 112—8 |
| Mooney Vis. at 1½'-4' | 93—81 | 69—58 |
| Tensile p. s. i., cure: | | |
| 15' | 3,030 | 2,790 |
| 30' | 3,410 | 3,320 |
| 45' | 3,370 | 3,610 |
| Elongation per cent at cure: | | |
| 15' | 860 | 850 |
| 30' | 750 | 770 |
| 45' | 695 | 740 |
| Modulus at 300% Elongation at cure: | | |
| 15' | 365 | 330 |
| 30' | 530 | 480 |
| 45' | 630 | 580 |

The foregoing examples disclose a limited number of embodiments of the present invention but it will be understood that this invention is not limited thereto since numerous variations are possible without departing from the spirit of this invention as defined in the following claims:

What I claim and desire to secure by Letters Patent is:

1. The process of producing synthetic rubber-like polymerizates of good processability which comprises polymerizing in aqueous emulsion a mixture of a major proportion of a butadiene-1,3 hydrocarbon and a minor proportion of another unsaturated organic compound copolymerizable therewith in aqueous emulsion, using a water soluble soap emulsifier, from 0.001 to 1.0 weight percent of a hydrocarbon soluble peroxide, from 0.05 to 0.50 weight percent of an alkali persulfate, from 0.1 to 1.0 weight percent based on the re-

TABLE III

*Effect of saturated acids and hydrocarbon soluble peroxide upon physical properties*

| Run No. | Emulsifier | Uncombined Fatty Acid | Per cent on H₂O | Benzoyl Peroxide per cent on Monomers | Conv., per cent | Band Time Min. at 100° F. | Max. Band. Temp., ° F. | Cure Min. at 287° F. | Modulus at 300% Elong. | Tensile p. s. i. | Elong., per cent | Williams Plast.-Rec. | Mooney Vis. 1½'-4' |
|---|---|---|---|---|---|---|---|---|---|---|---|---|---|
| 218-44-3 | Na-salt of Hydrogenated Tallow Acids. | | | | ¹88.5 | 4½ | 120 | 15<br>30<br>45 | 657<br>718<br>851 | 3,640<br>3,580<br>3,520 | 680<br>610<br>550 | 144–53 | 120–123 |
| 218-44-8 | ...do | Stearic | 2.0 | 0.01 | ²95 | >10 | | 15<br>30<br>45 | 630<br>813<br>923 | 3,450<br>3,250<br>3,470 | 750<br>630<br>610 | 134–22 | 96–95 |
| 218-44-13 | Na-oleate | | | | ³89 | >10 | | 15<br>30<br>45 | 640<br>660<br>725 | 3,700<br>3,550<br>3,220 | 730<br>650<br>610 | 140–34 | 113–104 |
| 218-44-12 | ...do | Stearic | 2.0 | 0.01 | ¹87.5 | >10 | | 15<br>30<br>45 | 610<br>760<br>705 | 3,400<br>3,400<br>3,270 | 710<br>680<br>650 | 127–25 | 77–65 |

¹ Run 16 hours at 35° C.
² Run 20 hours at 35° C.
³ Run 17 hours at 35° C.

EXAMPLE VI

The following experiments illustrate the use of an unsaturated fatty acid of high molecular weight and a hydrocarbon soluble peroxide in the preparation of an acrylonitrilediolefin copolymer of good plasticity, tensile strength, good banding time and high temperature milling characteristics. A regular control run was made in the absence of an unsaturated acid and benzoyl peroxide to serve as a comparison.

actants of a mercapto polymerization modifier having 8 to 18 carbon atoms per molecule, from 0.7 to 5.0 weight percent based on the water phase of a polyolefinic, higher fatty acid in the free state.

2. The process as defined in claim 1 wherein the amount of free fatty acid present is sufficient to maintain the reaction mixture at a pH between 7.0 and 8.2 throughout the polymerization reaction.

3. The process as defined in claim 1 wherein the polyolefinic fatty acid is conjugated soybean acid.

4. The process of producing synthetic rubber-like polymerizates of good processability which comprises polymerizing in aqueous emulsion a mixture of a major proportion of a butadiene-1,3 hydrocarbon and a minor proportion of acrylonitrile using an alkali metal salt of a higher fatty acid as emulsifier, from 0.001 to 1.0 weight percent of a hydrocarbon soluble peroxide, from 0.05 to 0.50 weight percent of an alkali persulfate, from 0.1 to 1.0 weight percent based on the reactants of a mercapto polymerization modifier having 8 to 18 carbon atoms per molecule, and from 0.7 to 5.0 weight percent based on the water phase of a polyolefinic, higher fatty acid in the free state.

5. The process of producing synthetic rubber-like polymerizates of good processability which comprises polymerizing in aqueous emulsion a mixture of a major proportion of a butadiene-1,3 hydrocarbon and a minor proportion of styrene, using a water soluble soap emulsifier, from 0.001 to 1.0 weight percent of a hydrocarbon soluble peroxide, from 0.05 to 0.50 weight percent of an alkali persulfate, from 0.1 to 1.0 weight percent based on the reactants of a mercapto polymerization modifier having 8 to 18 carbon atoms per molecule, and from 0.7 to 5.0 weight percent based on the water phase of a polyolefinic higher fatty acid in the free state.

6. The process of producing synthetic rubber-like polymerizates of good processability which comprises polymerizing in aqueous emulsion a mixture of a major proportion of a butadiene-1,3 hydrocarbon and a minor proportion of acrylonitrile using an alkali metal salt of a higher fatty acid as emulsifier, from 0.001 to 1.0 percent of a hydrocarbon soluble peroxide, from 0.05 to 0.50 weight percent of an alkali persulfate, from 0.1 to 1.0 weight percent based on the reactants of a mercapto polymerization modifier having 8 to 18 carbon atoms per molecule, from 0.7 to 5.0 weight percent based on the water phase of a polyolefinic higher fatty acid in the free state, said amount of free fatty acid being sufficient to maintain the reaction mixture at a pH between 7.0 and 8.2 throughout the polymerization reaction, flashing off unpolymerized reactants, adding a phenyl-beta-naphthylamine stabilizer to the resultant latex, adding an amount of alkali sufficient to neutralize the free fatty acid present in the latex, coagulating the latex by means of brine, washing and drying the coagulated polymer.

7. The process of producing synthetic rubber-like polymerizates of good processability which comprises polymerizing in aqueous emulsion a mixture of a major proportion of butadiene-1,3 and a minor proportion of styrene, using an alkali metal salt of a higher fatty acid as emulsifier, from 0.001 to 1.0 weight percent of a hydrocarbon soluble peroxide, from 0.05 to 0.50 weight percent of an alkali persulfate, from 0.1 to 1.0 weight percent based on the reactants of a mercapto polymerization modifier having 8 to 18 carbon atoms per molecule, and from 0.7 to 5.0 weight percent based on the water phase of a polyolefinic higher fatty acid in the free state, said amount of free fatty acid being sufficient to maintain the reaction mixture at a pH between 7.0 and 8.2 throughout the polymerization reaction, flashing off unpolymerized reactants, adding an anti-oxidant stabilizer to the resultant latex, adding an amount of alkali sufficient to neutralize the free fatty acid present in the latex, coagulating the latex by means of brine, washing and drying the coagulated polymer.

8. The process which comprises polymerizing a butadiene-1,3 hydrocarbon in aqueous emulsion using a water soluble soap emulsifier, from 0.1 to 1.0 weight percent based on the reactants of a mercapto polymerization modifier having 8 to 18 carbon atoms per molecule, from 0.001 to 1.0 weight percent based on the reactants of a hydrocarbon soluble peroxide, from 0.05 to 0.50 weight percent of an alkali persulfate catalyst and from 0.7 to 5.0 weight percent based on the water phase of an unsaturated higher fatty acid in the free state.

GEORGE E. SERNIUK.

REFERENCES CITED

The following references are of record in the file of this patent:

UNITED STATES PATENTS

| Number | Name | Date |
| --- | --- | --- |
| 2,234,076 | Gumlich | Mar. 4, 1941 |
| 2,281,613 | Wollthan et al. | May 5, 1942 |
| 2,300,056 | Meis | Oct. 27, 1942 |
| 2,306,411 | Schoenfeld | Dec. 29, 1942 |
| 2,327,975 | Zaucker | Aug. 24, 1943 |
| 2,335,124 | Konrad et al. | Nov. 23, 1943 |
| 2,366,325 | Fryling | Jan. 2, 1945 |
| 2,384,571 | Semon | Sept. 11, 1945 |

FOREIGN PATENTS

| Number | Country | Date |
| --- | --- | --- |
| 364,089 | Great Britain | Dec. 21, 1931 |
| 543,152 | Germany | Feb. 1, 1932 |
| 596,769 | Germany | May 9, 1934 |